Sept. 2, 1958 R. P. VINCENT 2,850,339
FREE PISTON SEAL
Filed Jan. 26, 1956 2 Sheets-Sheet 1

INVENTOR.
RENIC P. VINCENT
BY
ATTORNEY

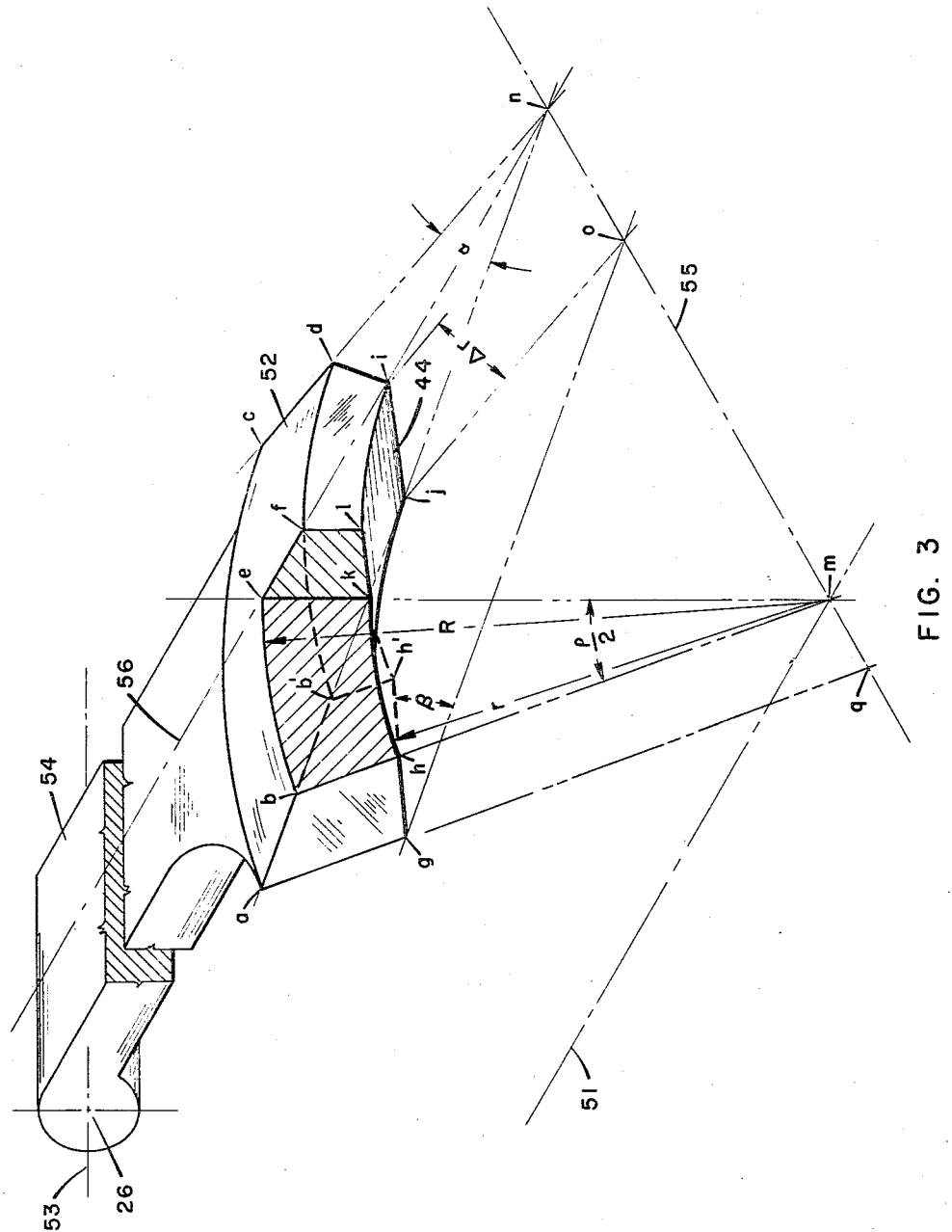

United States Patent Office 2,850,339
Patented Sept. 2, 1958

2,850,339

FREE PISTON SEAL

Renic P. Vincent, Tulsa, Okla., assignor to Pan American Petroleum Corporation, a corporation of Delaware Application January 26, 1956, Serial No. 561,467

7 Claims. (Cl. 309—4)

This invention relates generally to a free piston which reciprocates in a vertical conduit such as that used for producing liquids from a well. More particularly, this invention relates to an improved packing or sealing element.

In the producing of oil and water wells, free pistons have been employed to provide a solid divider by which the liquids have been lifted with gas. These free pistons are generally of two types, including (1) those which have a fixed external diameter and thus are limited to use in a conduit having a substantially constant internal diameter, and (2) those which have a variable external diameter and, therefore, accommodate minor tolerances in the internal diameter of a conduit. Since API standards permit minor tolerances, the second type is generally preferred. This invention is directed to the latter type and is particularly directed to that part of the free piston, the packer, which provides the variable diameter to seal the free piston in the conduit and prevent fluid flow around the free piston. Various types of these variable diameter sealing elements have been proposed, including rubber elements and resiliently mounted metallic elements. All of these sealing elements have at least one common feature which makes them impractical for use in some wells. In those wells which produce solids such as wax and paraffin with the liquid, the free piston sealing elements heretofore used have generally been unsatisfactory due to the accumulation of the solids in the seal. This accumulation sooner or later causes malfunction of the free piston and requires attention or maintenance.

Figure 1:
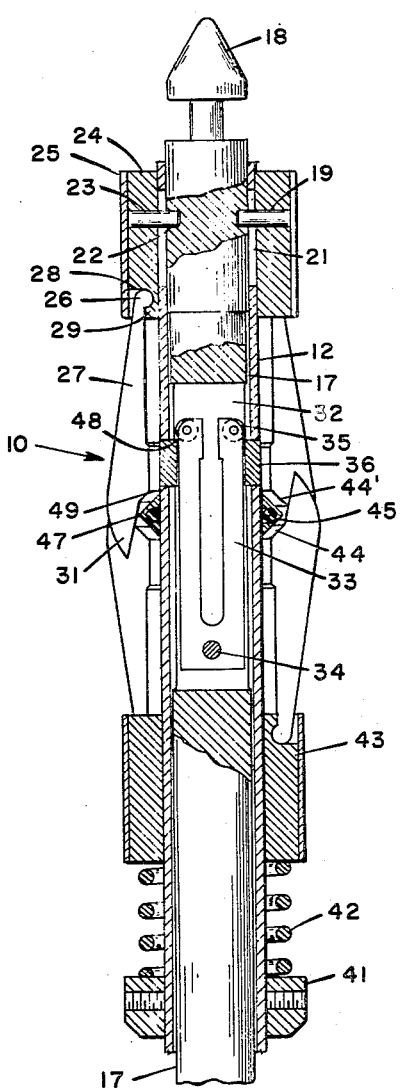
Figure 2:
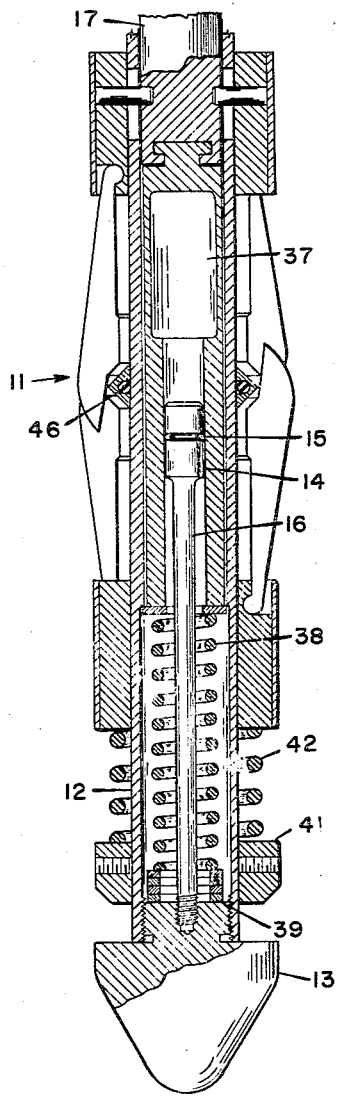

It is, therefore, an object of this invention to provide an improved free piston. It is a more specific object of this invention to provide an improved type of sealing element for a free piston. These and other objects of this invention will become apparent from the following description. In this description, reference will be made to the accompanying drawings, in which:

Figures 1 and 2 are together a cross-sectional view of a free piston employing my improved elements; and Figure 3 is an oblique view, partially in cross section, of one segment of the sealing element shown in Figures 1 and 2.

The invention herein described comprises briefly a sealing element or packer particularly adapted for a free piston operating in oil and gas wells which produce paraffin or other solids and includes means for separating segments of the sealing element so that any accumulation of solids can be periodically flushed out of the seal. It includes particularly the use of metallic segments in a free piston packing element that can be separated periodically, preferably on the down or return stroke in a pumping system, and be joined on the power stroke to provide a fluid seal in a vertical conduit.

Referring now to Figures 1 and 2 for a more detailed description of this invention, the packers or sealing elements 10 and 11 are shown mounted on one type of a free piston. This free piston includes a center shaft or tubular body 12 which extends generally from the top of the free piston to the bottom and has a centering device or guide 13 affixed to the lower end. A piston 14 having a piston ring 15 is connected by a piston rod 16 to the guide 13. A control rod 17 which extends through the tubular body 12 actuates the expansion and contraction of the sealing elements. This control rod may have a fishing head 18 at the top to facilitate recovery of the free piston in case it becomes lodged in a conduit such as a well tubing. Pins 19 which extend through slots 21 in the body connect the control rod to the upper half of the sealing elements. These pins are anchored in a hole 22 in the control rod and in a hole 23 in the upper bracket 24 and are held in place by a sleeve 25 which is fitted over the bracket. This sleeve also holds the anchored end 26 of each of the seal segments 27. These segments are held in the brackets for lateral or radial rotation about the anchored end by providing a transverse groove 28 for each bracket and a shoulder 29. This permits radial movement about the anchored end 26 so that the free end 31 of the segment can expand and contract to change the diameter and cross-sectional area of the seal.

A longitudinal slot 32 in the control rod is provided for a toggle fork or snap-acting device 33. This fork is mounted in the slot 32 on a pin 34. Rollers 35 are mounted in the fork ends and are adapted to expand diametrically to a diameter substantially equal to the internal diameter of the tubular body. Toggle blocks 36 having an internal spacing less than the greatest spacing of the rollers 35 are oppositely disposed in the tubular body. This snap-acting device, as will be explained in greater detail hereinafter, provides a means to maintain the sealing elements expanded while the free piston is making a complete power stroke and contracted throughout the complete return stroke of the free piston. The lower end of the control rod contains an open cylinder 37 which is open at the lower end and which receives piston 14. This cylinder is typically filled with a gas to provide means, as shown for example in my U. S. Patent No. 2,688,928, for expanding the sealing elements at the bottom of a well and contracting them at the top. A spring 38 which may be calibrated to adapt the free piston to use in wells of different pressure and to cause the free piston to fall to different depths in a well is placed in compression between guide 13 and the lower end of control rod 17. Calibration washers 39 may be added or removed, if desired, to change the calibration of spring 38. It will be apparent that springs having different spring constants may also be used to change the operating characteristics of the free piston.

The sealing elements, of which there are preferably two or more on each free piston, are each divided into upper and lower halves. The upper half, as indicated above, is connected to and operated by the control rod 17. The lower half is connected to the body 12. This connection is made by attaching an anchoring ring 41 to the body by set screws, welding, or the like. A spring 42 placed between this anchoring ring and the lower bracket 43 urges the lower half of the seal upward and into resilient engagement with the upper half of the seal when the seal is expanded. In an alternate embodiment each of the segments may be individually connected by resilient means to the body. The lower bracket 43, in which the sealing ring segments are rotatably anchored, slides on the body and when the sealing element is expanded against the inside of the cylinder or tubing in which it operates, spring 42 is slightly compressed to maintain a radial force outwardly against the cylinder wall. This force is produced by the frustro-conical surfaces 44 and 44' reacting against a cam or ring 45. This ring is sealed on the body with, for example, an O ring 46 which permits the ring to move axially along the body. The upper and lower external surfaces of the ring are desirably sloped at the same angle as the angle of the frustro-conical surface 44 so that the periphery preferably comes to a point 47. Where expansion of the sealing element is accomplished as in the illustrated embodiment by movement of only one of the upper or lower halves of the element, then the ring 45 is preferably movably sealed on the internal shaft or body so that it is relatively free to move axially and thus displace upper and lower segments radially by substantially the same amount. The lower segments being resiliently mounted, as shown in the drawings, and the ring 45 being movably sealed on the body, it can be seen that when the upper half of the sealing element is lowered to expand the sealing element, the frustro-conical surface 44' on the segments of the upper half of the seal contacts the ring 45. This forces the movable ends 31 of these upper segments out against the inside cylinder wall. When the segments cannot be further expanded, the ring is moved axially downward along the body until it contacts the frustro-conical surface 44 on the segments of the lower half of the seal, forcing these segments to expand radially. Since there is practically always some variation in the internal diameter of the cylinder, particularly in the internal diameter of a tubing string in which a free piston operates, the axial movement of the control rod in the body cannot always be adjusted initially to provide the proper external diameter on the expanded sealing element. Accordingly, this initial axial movement of the control rod in the body is typically greater than the movement required to expand the sealing element to the nominal or mean diameter of the cylinder or tubing. After expanding the sealing element to this nominal diameter, any extra movement of the control rod is transmitted through the segments, moving the ring 45 and the lower bracket 43 axially downward on the body. This places spring 42 in compression and provides means to expand the seal diametrically when it encounters a point in the tubing having an enlarged diameter. At a point in the tubing where the diameter is increasing, both the ring 45 and the lower bracket 43 are accordingly moved upward by the force of spring 42. Similarly, when the tubing diameter is decreasing, the seal segments are forced radially inward moving both ring 45 and lower bracket 43 axially downward. In either case, the axial movement of ring 45 is obviously only about one-half of the axial movement of lower bracket 43. In some cases, this ring may be sealed to the body by welding or may be a part of the body itself. In such case, however, both the upper bracket 24 and the lower bracket 43 are movably mounted on the body and resiliently urged against the ring 45. Similarly, both the upper and lower halves of the sealing elements may be oppositely actuated to open and close symmetrically on the ring. By these means the radial forces produced against the inner surface of the cylinder by both the upper group of segments and the lower group of segments are substantially equal.

In operation, the free piston is dropped into the upper end of a well tubing with the sealing elements contracted radially as shown in Figures 1 and 2. Spring 38 causes these sealing elements to be radially contracted until the free piston reaches a point in the tubing at which the pressure is great enough to force piston 14 further into cylinder 37. This is caused by subjecting the free piston to a predetermined pressure caused either by submerging the piston in liquid at the bottom of a well and/or by applying a wellhead pressure. The force in any case is great enough to compress the gas in the cylinder. Actually, the piston does not move in the cylinder until the hydrostatic head of liquid in the tubing above the free piston or the hydrostatic head plus the wellhead pressure is great enough to cause the rollers 35 to contract and pass over the toggle blocks 36. When the force on the unbalanced area of the upper end of control rod 17 is great enough to cause these rollers to pass the upper shoulders 48, the cylinder being filled with a compressible gas, the control rod will be moved by the available energy until the rollers pass the lower shoulders 49. At this position, the upper half of each sealing element has been moved down a sufficient amount to expand the sealing elements to a diameter greater than the nominal diameter of the cylinder or tubing in which the free piston operates. Accordingly, the segments are held resiliently against the inside surface of the cylinder due to the compression of spring 42. The sealing elements having thus been expanded by the buildup of pressure on the free piston, the free piston can be lifted through the tubing as, for example, by injecting gas below the free piston, or, in the case of a flowing well, the free piston will be lifted by the movement of the well fluids themselves. The free piston is carried along in either case on the power stroke by the differential pressure across the sealing elements. As it moves up through the tubing with the sealing elements expanded, variations in the internal diameter of the tubing are accommodated by corresponding variations in the diameter of the sealing elements, as explained above. As the free piston approaches the surface and the liquid above is discharged, the hydrostatic pressure on the free piston is gradually reduced. Since the gas in chamber 37 is at a pressure substantially greater than surface pressure, typically at a pressure between bottom hole and surface pressure, the differential pressure across piston 14 is increased as the pressure on the free piston is decreased. Eventually, when the external pressure on the free piston is reduced to a minimum, i. e., to wellhead pressure, this difference between the pressure of the gas in chamber 37 and the wellhead pressure is great enough to move piston 14 outwardly in the cylinder and displace the toggle rollers 35 over the lower shoulders 49 of toggle blocks 36. The upper half of each sealing element is thus moved axially upward separating the wedge-shaped segments and contracting the sealing elements so that the effective diameter is substantially less than the minimum diameter of the cylinder or tubing. In this condition, the free piston falls on the return stroke through the tubing to a bottom stop, to the bottom of the well or to some intermediate pressure position, the well fluids passing around through and between the segments so that any solid deposits picked up by the segments on the power stroke of the free piston will be flushed off by the well fluids and the segments can be properly seated together when the pressure is again increased to the predetermined value as described above. In a high-fluid-level well, the sealing elements will be expanded as the free piston falls through the liquid whenever the hydrostatic head above the free piston reaches the preset pressure. In a less productive well, on the other hand, it may be desirable in some cases to place a shock absorbing stop in the tubing so that the free piston is held at a desired elevation in the well until the liquids flowing past the sealing elements produce a hydrostatic head above the free piston great enough to expand the sealing elements.

Refer now specifically to Figure 3 for a more detailed description of the sealing segments 27 per se. The segments are constructed preferably symmetrically about an axis 51 which is the axis of the free piston. Each segment has, as indicated above, an anchored end 26 which permits the sealing head 52 to rotate about an axis 53. The arm 54 may be of any desired length and is typically in the range of about 2–4 inches. The external surface *abcd* of the sealing head is a cylindrical surface on the axis 51 having a radius R equal to one-half the nominal diameter of the cylinder or tubing in which the free piston operates. The internal frusto-conical surface 44*ghij*, as pointed out above, has a nominal radius $r$, i. e., a radius in the plane *behkm* at the nominal diameter longitude $m$ equal to the outside diameter of ring 45. The difference between the minimum and maximum radii $\Delta r$ of this surface is preferably greater, e. g. 10 to 50 percent greater, than the permissible tolerance in the internal diameter of the cylinder or tubing in which the free piston operates. This tolerance may be found by calipering the inside of the tubing or, in most cases, it can be assumed that this tolerance is within the limits permitted by API standards. Typically, the inside diameter tubing tolerance is less than 3/32 inches. Therefore, $\Delta r$ may be, for example, 1/8 inch or thereabout. While the surface 44 may be frustroconical on axis 51, for a more accurate fit with ring 45 this surface may be elliptical on an axis parallel with the line $ij$. That is, the surface may be cylindrical symmetrically about the minor axis of an ellipse so that there is substantially a perfect seal between that surface and the point 47 of ring 45. The angle $\beta$ which is the slope of this surface relative to axis 51 is determined by the number of segments required to make a complete ring and by the angle $\alpha$. The angle $\alpha$ is the axial angle between the planes $abghnq$ and $cdijnq$, i. e., the axial angle between the transverse ends of each segment. An even number of segments, typically 2 to 10 or more, are anchored in the brackets on each of the upper and lower halves of each sealing element and when the sealing element is expanded, adjacent transverse ends of the sealing segments are in contact along a radial line in a plane perpendicular the axis 51. At the nominal diameter, the transverse ends of the segments are in contact on a radial line, preferably halfway between the longitudinal ends of the segments. That is, assuming that the nominal diameter is halfway between the maximum and minimum diameter, the nominal radius $r$ of frustro-conical surface 44 is in a plane $bem$ in which $\overline{gh} = \overline{kl}$. At any other diameter different from the nominal diameter, the transverse ends of the segments are in contact along some other radial line. The peripheral length of each segment at the nominal diameter longitude, where the inside radius $r$ is equal to the radius of ring 45, is, therefore, equal to the nominal inside circumference of the tubing divided by the number of segments. The transverse ends $abgh$ and $cdij$ of each segment are plane surfaces formed at an angle $\alpha$ axially, as explained above. These plane surfaces are also formed at an angle $\rho$ radially in any plane perpendicular to axis 51. Stated otherwise, the transverse ends of the segments are plane surfaces which intersect axially at an angle $\alpha$ on a line 55 that crosses the axis 51 at point $m$, the nominal diameter longitude. In further explanation, the nominal diameter longitude may be defined as the position on axis 51 at which the segments and the ring 45 form a fluid seal in a plane perpendicular to axis 51 when the sealing element is expanded by ring 45 to an internal radius R equal to one-half of the nominal diameter of the tubing. The cut-away surface $bekh$ and point $m$ are in this plane.

It will be apparent that the angle $\beta$, which is the slope of the surface $ghij$ relative to axis 51, is desirably correlated with the angle $\alpha$ such that the outside radius of each segment is expanded in proportion to the change in the total length of all segments transversely in a plane at which all segments and the ring contact. In other words, when the diameter of the tubing changes and the segments are moved longitudinally together, it is desirable that, as the line of contact between adjacent transverse ends moves, the ring 45 contacts the surfaces 44 and 44' along an arc in the same plane as said line to prevent fluid passage through the inside of the ring seal. This correlation is accomplished when the $$\text{angle } \beta \text{ is equal to } \tan^{-1}\left(\frac{n}{\pi} \tan \frac{\alpha}{2}\right)$$

where $n$ is the number of segments in the ring seal. All of the surfaces of the segments which function to produce the seal have thus been defined. The other surfaces, for example the two longitudinal ends of the segments, may be extended as desired so long as the transverse ends of any addition remains in the planes $aqn$ and $cqn$. It may be desirable, for example, to extend the wedge-shaped end of the segment out to approximately the line 55 and to bevel the outside surface of that end as shown in Figure 1 so that the segments will not catch on the ends of tubing joints or the like when the free piston passes a coupling.

The segment described above and shown in Figure 2 is symmetrical about axis 51 and center line 56. This is the preferred construction; however, other shapes can be employed. The angle $\alpha$ which is the angle between the transverse ends may also be varied over a substantial range. The main limitation upon this angle is that it must be small enough so that the angle $\beta$, as above defined, is substantially less than 90°. When the angle $\beta$ approaches 90°, the radial component of the force produced by the reaction of surfaces 44 and 44' against ring 45 as the segments are moved together is substantially decreased. Typically, the angle $\beta$ is in the range of about 20–70°. After establishing this angle, the angle $\alpha$ depends only upon the number of segments required to produce a complete ring as above described.

One of the particular advantages of the sealing element herein described is that the segments can be cast from metal, preferably from a hard alloy such as Hastelloy. Another particular advantage to this invention is, as indicated previously, that in a preferred embodiment when the two halves of a sealing element are separated longitudinally to contract the element diametrically, transverse ends of adjacent segments are separated so that as the free piston falls freely on the return stroke through the well fluids, the well fluids circulate past all sealing surfaces on each segment thereby removing any solids which might have accumulated on the power stroke. The sealing surfaces are consequently clean when the sealing element is again expanded and the sealing surfaces come into contact.

While means are provided in a preferred embodiment, as described above, for separating the segments on the return stroke, in some cases the sealing element may remain expanded continuously on both the power and the return stroke. In this embodiment the free piston is reciprocated, as is well known in the art, by operating the well only intermittently. The flushing action is not obtained in this embodiment but the seal does have other advantages over seals previously employed. For example, the use of a large number of segments permits it to pass inward deformities in the tubing wall and the sloping contacts between the segments allow the seal to contract and expand even when the surfaces are somewhat coated with solids.

From the foregoing it can thus be seen that this invention is susceptible of a wide variety of embodiments. This invention should, accordingly, be construed not to be limited to the embodiment above described which has been given by way of example. It should be limited only by the scope of the appended claims.

I claim:

1. A variable diameter seal for a cylinder having a nominal diameter with some diametrical tolerances comprising a central shaft, a ring sealed on said shaft coaxial with the axis of said shaft, a number $n$ of ring segments with alternate segments oppositely disposed symmetrically on each side of said ring when said seal is expanded, the ends transverse to the longitudinal axis (51, Figure 3) of each of said segments having plane surfaces which intersect axially at an angle $\alpha$ on a line (55, Figure 3) which intersects said axis substantially at the nominal diameter longitude of said segment, each of said segments having an external circumferential surface with a radius substantially equal to one-half of said nominal diameter and an internal surface with a radius substantially equal to the external radius of said ring, the angle of said internal surface relative to the axis of said segment being substantially equal to $$\tan^{-1}\left(\frac{n}{\pi}\tan\frac{\alpha}{2}\right)$$

means to mount said segments on said shaft, and resilient means to displace at least half of said internal surfaces longitudinally against said ring whereby said circumferential surfaces are urged outwardly and as they are moved outwardly the effective length of each segment is proportionately increased.

2. A variable diameter seal for a cylinder having a nominal diameter with some diametrical tolerances comprising a central shaft, a ring sealed on said shaft coaxial with the axis of said shaft, a number $n$ of ring segments with alternate segments oppositely disposed symmetrically on each side of said ring when said seal is expanded, the ends *abgh* and *cdij* having plane surfaces which intersect axially at an angle $\alpha$ on a line 55 which intersects said axis 51 substantially at the nominal diameter longitude (point *m*) of said segment, each of said segments having an external circumferential surface *abcd* with a radius R substantially equal to one-half of said nominal diameter and a frustro-conical internal surface *ghij* which at said nominal diameter longitude has a radius substantially equal to the external radius of said ring, the angle of said frustro-conical internal surface relative to the axis of said segment, angle $\beta$, being substantially equal to $$\tan^{-1}\left(\frac{n}{\pi}\tan\frac{\alpha}{2}\right)$$

means to mount said segments on said shaft, and resilient means to displace at least half of said frustro-conical internal surfaces longitudinally against said ring whereby said circumferential surfaces are urged outwardly and as they are moved outwardly the effective length of each segment is proportionately increased. (All references are to Figure 3 of the drawings.)

3. An internal ring seal for a pipe having a nominal diameter with some diametrical tolerance comprising a central shaft, a ring sealed on said shaft coaxial with the axis of said shaft, a multiplicity of ring segments with an equal number of alternate segments oppositely disposed symmetrically on each side of said ring when said seal is expanded, the ends transverse to the longitudinal axis of each of said segments having plane surfaces which intersect axially at an angle $\alpha$ and on the axis of said segment substantially at the nominal diameter longitude of said segment, each of said segments having an external cylindrical surface with a radius substantially equal to one-half of said nominal diameter and a frustro-conical internal surface which at said nominal diameter longitude has a radius substantially equal to the external radius of said ring, the angle of said frustro-conical internal surface relative to the axis of said segment being substantially equal to $$\tan^{-1}\left(\frac{n}{\pi}\tan\frac{\alpha}{2}\right)$$

where $n$ is the number of segments in said ring seal, means to mount said segments on said shaft, and resilient means to displace at least half of said frustro-conical internal surfaces longitudinally against said ring whereby said circumferential surfaces are urged outwardly and as they are moved outwardly, the effective length of each segment is proportionately increased to provide a continuous impermeable seal.

4. An internal ring seal according to claim 3 wherein said ends transverse to the longitudinal axis of each of said segments are plane surfaces substantially symmetrical about the center line (57, Figure 3) of said segments.

5. A free piston for use in a tubing having a nominal diameter with some diametrical tolerance including a tubular body, a control rod extending through said body, at least one sealing element on said body, means connecting one end of said sealing element to said control rod, means connecting the other end of said sealing element to said body, a ring movably mounted on said body, and means to displace said control rod axially in said body to compress said sealing element axially and expand said sealing element diametrically, said sealing element comprising a number of $n$ of ring segments coaxial with the axis (51, Figure 3) of said body and having an equal number of alternate segments oppositely disposed symmetrically on each side of said ring when said seal is expanded diametrically, the ends transverse to said axis having plane surfaces which intersect axially at an angle $\alpha$ and on a line (55, Figure 3) which intersects said axis substantially at the nominal diameter longitude (point *m*, Figure 3), of said segments, each of said segments having an external circumferential surface (*abcd*, Figure 3) with a radius (R, Figure 3) substantially equal to one-half of said nominal diameter and an internal surface (*ghij*, Figure 3) with a radius perpendicular to said axis substantially equal to the external radius of said ring, the angle of said internal surface relative to said axis (angle $\beta$, Figure 3) being substantially equal to $$\tan^{-1}\left(\frac{n}{\pi}\tan\frac{\alpha}{2}\right)$$

6. A free piston according to claim 5 including resilient means to mount at least half of said segments on said body, and means responsive to changes in pressure on said free piston to displace at least half of said internal surfaces longitudinally against said ring whereby alternate segments are joined to form a continuous ring seal and the inside of said ring seal is closed by said ring under predetermined pressure conditions on said free piston.

7. An expandable packer for reciprocation by the fluids in a vertical conduit comprising a tubular body, a ring sealed on said body, a number of wedge-shaped ring segments disposed around said body with alternate segments on opposite sides of said ring, means to urge said segments axially together on the power stroke of said packer, means including said ring for expanding said segments radially as they are moved axially together, and means to move said segments axially apart on the return stroke of said packer whereby solids deposited on said segments during said power stroke are flushed off by said fluids on said return stroke.

References Cited in the file of this patent

UNITED STATES PATENTS

| 160,203 | Kees et al. | Feb. 23, 1875 |
| 1,018,826 | Hull | Feb. 27, 1912 |
| 2,099,322 | Nelson | July 23, 1935 |
| 2,674,956 | Hilton | Apr. 13, 1954 |